(12) United States Patent
Huang et al.

(10) Patent No.: US 10,750,448 B2
(45) Date of Patent: Aug. 18, 2020

(54) WAKE-UP RADIO ADVERTISEMENT CHANNEL

(71) Applicant: Intel IP Corporation, Santa Clara, CA (US)

(72) Inventors: Po-Kai Huang, San Jose, CA (US); Shahrnaz Azizi, Cupertino, CA (US); Noam Ginsburg, Portland, OR (US); Daniel F. Bravo, Portland, OR (US); Thomas J. Kenney, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 9 days.

(21) Appl. No.: 16/144,884

(22) Filed: Sep. 27, 2018

(65) Prior Publication Data
US 2019/0045444 A1    Feb. 7, 2019

Related U.S. Application Data

(60) Provisional application No. 62/564,848, filed on Sep. 28, 2017.

(51) Int. Cl.
*H04W 52/02* (2009.01)
*H04W 48/10* (2009.01)
*H04W 76/28* (2018.01)

(52) U.S. Cl.
CPC ....... *H04W 52/0229* (2013.01); *H04W 48/10* (2013.01); *H04W 52/0216* (2013.01); *H04W 52/0219* (2013.01); *H04W 76/28* (2018.02)

(58) Field of Classification Search
CPC ......... H04W 52/0229; H04W 52/0216; H04W 52/0219; H04W 76/28; H04W 48/10
See application file for complete search history.

(56) References Cited

U.S. PATENT DOCUMENTS

| | | | | |
|---|---|---|---|---|
| 5,438,329 | A  * | 8/1995 | Gastouniotis | G01D 4/006 340/870.02 |
| 2014/0219261 | A1* | 8/2014 | Johnsson | H04W 12/06 370/338 |
| 2016/0366598 | A1* | 12/2016 | Gallagher | G08G 1/161 |
| 2018/0317172 | A1* | 11/2018 | Lepp | H04W 68/005 |
| 2019/0200298 | A1* | 6/2019 | Park | H04L 27/2607 |

* cited by examiner

*Primary Examiner* — Walter J Divito
(74) *Attorney, Agent, or Firm* — Eversheds Sutherland (US) LLP

(57) ABSTRACT

This disclosure describes systems, methods, and devices related to wake-up radio (WUR) advertisement channels. A device may include a wake-up receiver (WURx) and a primary connectivity radio. The device may determine a wake-up radio (WUR) discovery subchannel for WUR advertisement. The WUR discovery subchannel may be associated with a channel of a frequency band. The device may generate a WUR discovery frame comprising a WUR advertisement. The device may transmit, by the WURx, the WUR discovery frame to a second device using the WUR discovery subchannel. The device may identify a response from the second device indicating an acknowledgment of the WUR discovery frame.

19 Claims, 9 Drawing Sheets

WAKE-UP RADIO ADVERTISEMENT CHANNEL

CROSS-REFERENCE TO RELATED APPLICATION(S)

This application claims the benefit of U.S. Provisional Application No. 62/564,848, filed Sep. 28, 2017, the disclosure of which is incorporated herein by reference as if set forth in full.

TECHNICAL FIELD

This disclosure generally relates to systems and methods for wireless communications and, more particularly, to wake up radio (WUR) advertisement channels.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

BRIEF DESCRIPTION OF THE DRAWINGS

The present disclosure is illustrated by way of example and not limitation by the figures of the accompanying drawings, in which like references indicate similar elements and in which.

DETAILED DESCRIPTION

Figure 1:
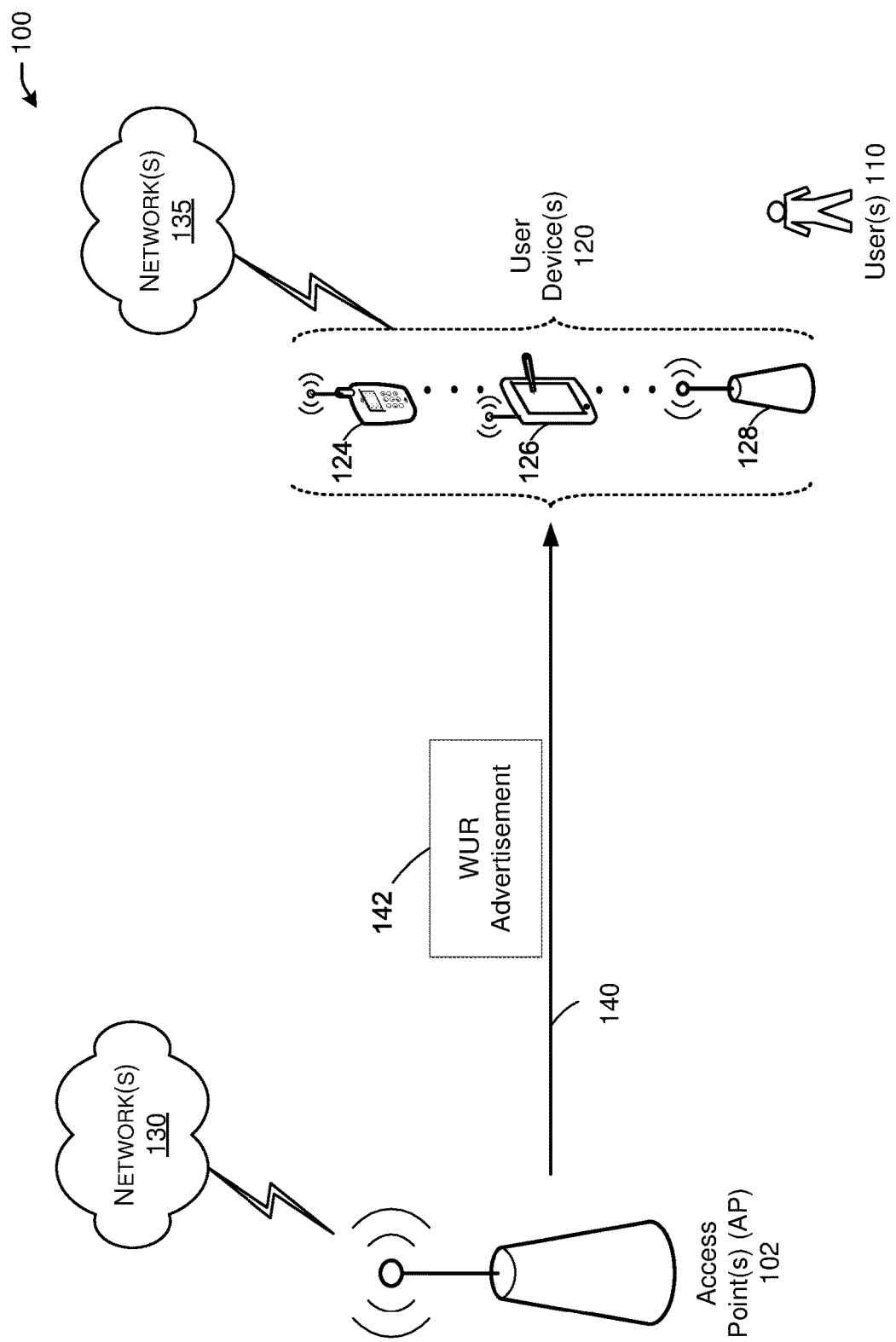
FIG. 1 depicts a network diagram illustrating an example network environment for a WUR advertisement channel, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Low Power Wake Up Receiver (LP-WURx) is a technique to enable ultra-low power operation for Wi-Fi devices. The idea is for a device to have a minimum radio configuration that can receive a wake-up packet from its peer. The LP-WURx includes a low-power wake-up radio (a LP-WUR, also referred to as a WUR) that will wake up the primary radio or processor (sometimes referred to as a primary connectivity radio) in response to receiving the wakeup packet. The LP-WUR may have a lower power requirement than the primary radio or processor. Hence, the device can stay in low power mode until receiving the wake-up packet from WUR transmitter. During this low power mode, the LP-WUR will be ON while the primary radio or processor will be OFF or in a low power state. In this manner, power may be conserved on the device. Generally, the transmitter will have a wake-up radio with both transmitting and receiving operation. At the receiver side, only the receiving operation will be implemented, and due to this reason, it is called a wake-up receiver (WURx) at the receiver side.

Without a LP-WUR, devices face a difficult tradeoff between saving power and providing data accessibility (sometimes referred to as latency or data delay). Specifically, a conventional device without a LP-WUR will save power by turning off the primary radio or by placing the primary radio in a limited functionality low power state. The amount of power saved is proportional to the amount of time the primary radio remains off or in a low power state. The tradeoff, however, is that any data packets destined for the device are delayed until the primary radio is switched back to a full power state. The introduction of a LP-WUR directly addresses this issue by allowing a device to power down the primary connectivity radio without causing a reduction in latency. The LP-WUR receives any data packets destined for the primary connectivity radio, and in response, can wake up the primary connectivity radio.

Traditionally, background scanning, whereby a device collects useful information to facilitate location mapping and roaming, is achieved by the primary connectivity radio of the device. The scanning operation usually consumes a lot of time and power and conflicts with the regular duties of the primary connectivity radio.

Due to the need for background scanning, an AP may transmit a WUR signal that is not a wake-up frame (e.g., a WUR advertisement) to facilitate the background scanning of any unassociated STAs.

There are 14, 20 MHz channels in 2.4 GHz band and 24, 20 MHz channels in 5 GHz band. Hence, there is a total of 38, 20 MHz channels that may be used by an AP to transmit WUR signals to enable background scanning operation. Further, since the bandwidth of a WUR signal may be less than 20 MHz (e.g., 4 MHz), it is possible for an AP to choose any 4 MHz bandwidth in the 20 MHz channel to transmit the WUR signal. Without knowing in advance what an AP may do, a STA may then need to scan 38*5=190, 4 MHz subchannels to collect background information. The exact number may be more depending on the method of inserting WUR signal in the tone plan of 20 MHz band. This certainly defeats the benefits of using a WURx for background scanning.

WUR transmissions are not 20 MHz, hence, further requirement is needed to reduce the number of 4 MHz subchannels that a STA needs to scan.

Example embodiments of the present disclosure relate to systems, methods, and devices for a WUR advertisement channel. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In one embodiment, a device may use a WURx for background scanning to relieve the burden on the more power hungry primary connectivity radio of the device. In some embodiments, a STA may use the WURx for background scanning when the STA has not associated with any APs to enable wake-up operation.

In some embodiments, a STA associated with an AP to enable wake-up operation may negotiate with the AP for a predefined or specific "on time" for the WURx. In some embodiments, the STA may use the WURx during the time not agreed upon for wake-up operation (e.g., the "off time") to do background scanning. In this manner, the STA can advantageously shift background scanning from the primary connectivity radio to the WURx during periods of time where the WURx would otherwise be idle.

As discussed previously herein, there are a large number of potential subchannels that the WURx may need to check during background scanning. For example, the 5 MHz band includes 24 20-MHz channels and 120 4-MHz subchannels.

In one embodiment, to reduce the number of 4 MHz subchannels that a WURx needs to scan, a WUR advertisement channel system may define specific subchannels less than 20 MHz for an AP to transmit WUR advertisement information. A WUR advertisement channel system may have specific subchannels in different bands to facilitate discovery in different bands. In other words, specific subchannels for each band may be defined for transmitting WUR discovery frames that include WUR advertisement information.

In some embodiments, the band for transmitting WUR advertisements includes the 2.4 GHz band, the 5 GHz band, the 5.9 GHz band, the 6 GHz band, the 60 GHz band, and the sub 1 GHz band. In some embodiments, the subchannel within each band for transmitting WUR advertisements includes 13 subcarriers and a 312.5 kHz subcarrier spacing.

In some embodiments, the band for transmitting WUR advertisements is the 2.4 GHz band. In some embodiments, the subchannel within the 2.4 GHz band for transmitting WUR advertisements is in channel 6, although other channel designations for locating the subchannel are within the contemplated scope of the disclosure.

In some embodiments, the band for transmitting WUR advertisements is the 5 GHz band. In some embodiments, the channel within the 5 GHz band which includes the subchannel for transmitting WUR advertisements is channel 44 or channel 149.

In some embodiments, the channel within the 5 GHz band which includes the subchannel for transmitting WUR advertisements depends upon which portions of the 5 GHz band local regulations allow STAs to operate in.

In some embodiments, local regulations permit operation only in the lower band (e.g., 5.150-5.250 GHz, referred to as UNII-1 by the FCC). In this scenario, the subchannel may be in channel 44 (e.g., 5.220 GHz), although other channel designations for locating the subchannel are within the contemplated scope of the disclosure.

In some embodiments, local regulations permit operation only in the upper band (e.g., 5.725-5.825 GHz, referred to as UNII-3 by the FCC). In this scenario, the subchannel may be in channel 149 (e.g., 5.745 GHz), although other channel designations for locating the subchannel are within the contemplated scope of the disclosure.

In some embodiments, local regulations permit operation in both the upper and lower portions of the 5 GHz band. In this scenario, the subchannel may be in channel 149 (e.g., 5.745 GHz), although other channel designations for locating the subchannel are within the contemplated scope of the disclosure.

In some embodiments, the band for transmitting WUR advertisements is the 5.9 GHz band. In some embodiments, the subchannel within the 5.9 GHz band for transmitting WUR advertisements is in channel 172, channel 178, or channel, 184, although other channel designations for locating the subchannel are within the contemplated scope of the disclosure.

In some embodiments, to prevent or otherwise mitigate adjacent channel interference, the subchannel for WUR advertisements is defined as the centermost or central subchannel location within the respective channel.

In some embodiments, the subchannel follows the 20 MHz tone plan of 802.11ax and is in the central location of a 20 MHz channel in the 2.4 GHz or 5 GHz band (i.e., subcarrier indexes 4*x, where x ranges from −6 to 6). In some embodiments, the subcarrier spacing for 802.11ax implementations is 78.125 kHz.

In some embodiments, the subchannel follows the 20 MHz tone plan of 802.11a/n/ac and is in the central location of a 20 MHz channel in the 2.4 GHz or 5 GHz band (i.e., subcarrier indexes from −6 to 6). In some embodiments, the subcarrier spacing for 802.11a/n/ac implementations is 312.5 kHz.

In some embodiments, the subchannel follows the 10 MHz tone plan of OFDM or 802.11p and is in the central location of a 10 MHz channel in the 5.9 GHz band (i.e., subcarrier indexes 2*x, where x ranges from −6 to 6). In some embodiments, the subcarrier spacing for 802.11p implementations is 156.25 kHz.

Compared with the existing solution, the WUR advertisement channel system may reduce the amount of subchannels that a STA needs to scan for collecting background information. The benefits include faster roaming based on the scanning results and less power consumption for background scanning.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for a WUR advertisement channel, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
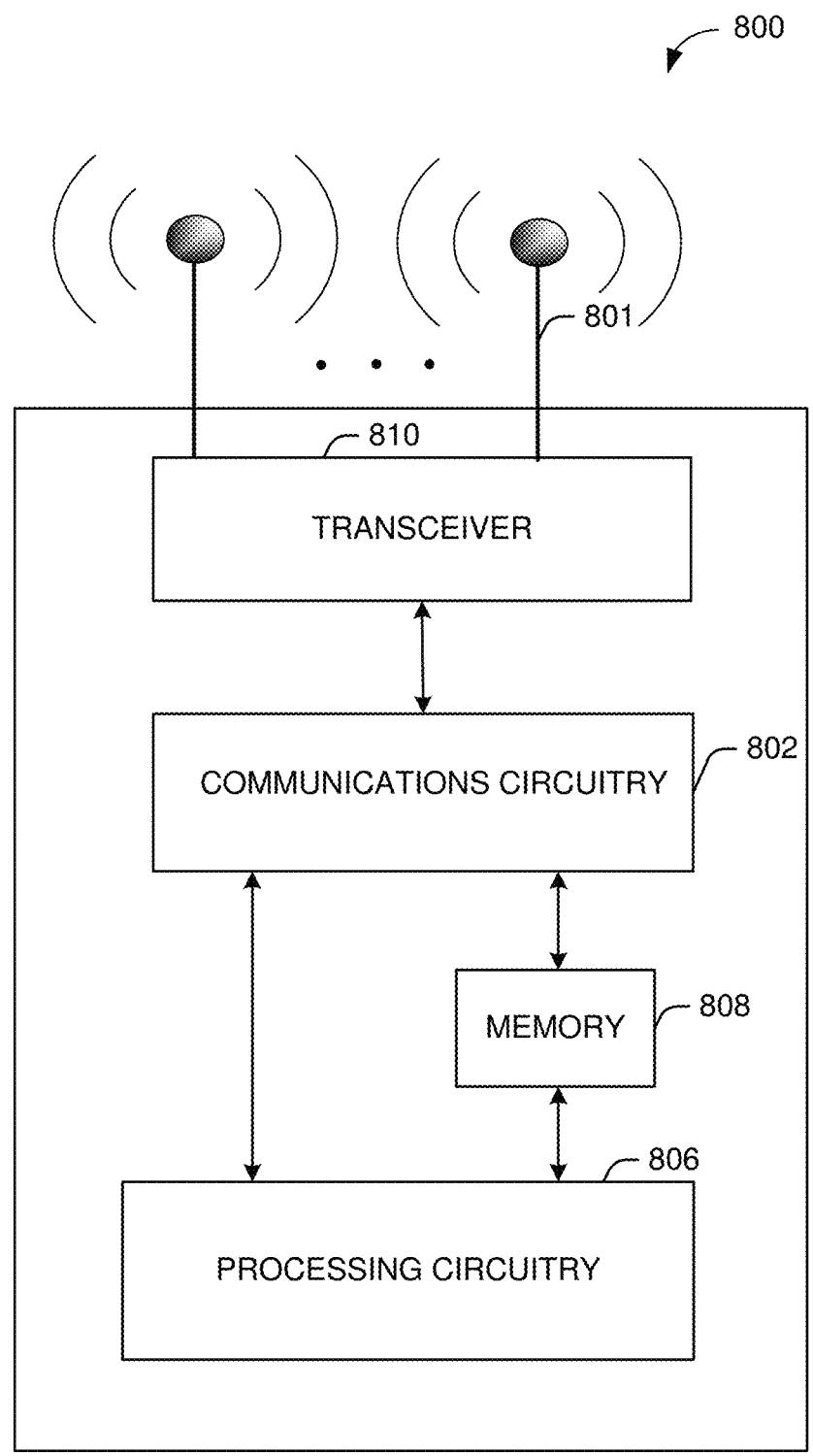
FIG. 8 illustrates a functional diagram of an exemplary communication station that may be suitable for use as a user device, in accordance with one or more example embodiments of the present disclosure.
Figure 9:
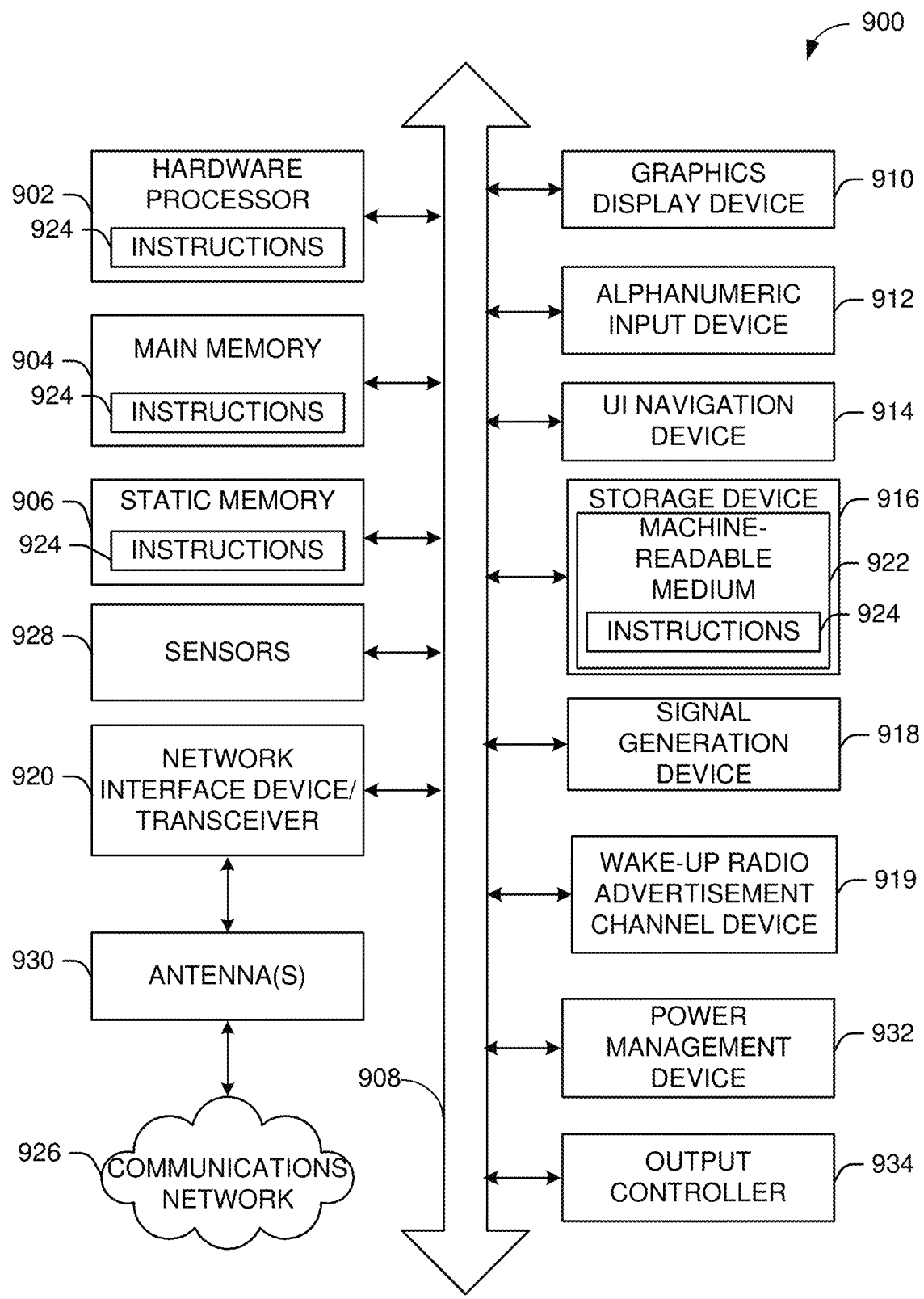
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When one or more AP (e.g., AP(s) 102) establish communication 140 with one or more user devices 120 (e.g., user devices 124, 126, and/or 128), the AP(s) 102 may communicate in a downlink direction and the user devices 120 may communicate with one or more AP(s) 102 in an uplink direction by sending data frames in either direction. The user devices 120 may also communicate peer-to-peer or directly with each other with or without the AP 102. The communication 140 may be multiuser communication between an AP and one or more user devices. The one or more user devices may belong to the same or different BSS.

The one or more user devices 120 may operate in a low power mode (e.g., a LP-WUR mode) to conserve power. During this time, the LP-WUR of a user device 120 may be active while an 802.11 transceiver may be inactive. Because the LP-WUR may operate in a lower power state than the 802.11 transceiver, power may be conserved on the user device 120.

In one embodiment, an AP 102 may send a wake-up radio (WUR) advertisement 142 to one or more user device(s) 120. The WUR advertisement 142 may signal to a user device 120 (e.g., a STA) various useful information, such as data to facilitate location mapping and roaming, according to one or more embodiments.

In one embodiment, the user device 120 may use a WURx for background scanning. In some embodiments, the user device 120 negotiates with the AP 102 during association for a predefined or specific "on time" for the WURx.

In some embodiments, the user device 120 may use the WURx during the time not agreed upon for wake-up operation (e.g., the "off time") to scan the communication 140 for WUR advertisements. In this manner, the user device 120 can advantageously shift background scanning from its primary connectivity radio to its WURx during periods of time where the WURx would otherwise be idle.

In some embodiments, the communication 140 includes a wake-up radio (WUR) discovery subchannel for transmitting WUR advertisements (e.g., the WUR advertisement 142) according to one or more embodiments. In some embodiments, the user device 120 may use the WURx during the "off time" to scan the WUR discovery subchannel within the communication 140 for WUR advertisements.

In some embodiments, the band for transmitting WUR advertisements includes the 2.4 GHz band, the 5 GHz band, the 5.9 GHz band, the 6 GHz band, the 60 GHz band, and the sub 1 GHz band. In some embodiments, the subchannel within each band for transmitting WUR advertisements includes 13 subcarriers and a 312.5 kHz subcarrier spacing.

In some embodiments, the band for transmitting WUR advertisements is the 2.4 GHz band. In some embodiments, the subchannel within the 2.4 GHz band for transmitting WUR advertisements is in channel 6, although other channel designations for locating the subchannel are within the contemplated scope of the disclosure.

In some embodiments, the band for transmitting WUR advertisements is the 5 GHz band. In some embodiments, the channel within the 5 GHz band which includes the subchannel for transmitting WUR advertisements is channel 44 or channel 149.

In some embodiments, the channel within the 5 GHz band which includes the subchannel for transmitting WUR advertisements depends upon which portions of the 5 GHz band local regulations allow STAs to operate in.

In some embodiments, local regulations permit operation only in the lower band (e.g., 5.150-5.250 GHz, referred to as UNII-1 by the FCC). In this scenario, the subchannel may be in channel 44 (e.g., 5.220 GHz), although other channel designations for locating the subchannel are within the contemplated scope of the disclosure.

In some embodiments, local regulations permit operation only in the upper band (e.g., 5.725-5.825 GHz, referred to as UNII-3 by the FCC). In this scenario, the subchannel may be in channel 149 (e.g., 5.745 GHz), although other channel designations for locating the subchannel are within the contemplated scope of the disclosure.

In some embodiments, local regulations permit operation in both the upper and lower portions of the 5 GHz band. In this scenario, the subchannel may be in channel 149 (e.g., 5.745 GHz), although other channel designations for locating the subchannel are within the contemplated scope of the disclosure.

In some embodiments, the band for transmitting WUR advertisements is the 5.9 GHz band. In some embodiments, the subchannel within the 5.9 GHz band for transmitting WUR advertisements is in channel 172, channel 178, or channel, 184, although other channel designations for locating the subchannel are within the contemplated scope of the disclosure.

It is understood that the above descriptions are for purposes of illustration and are not meant to be limiting.

Figure 2:
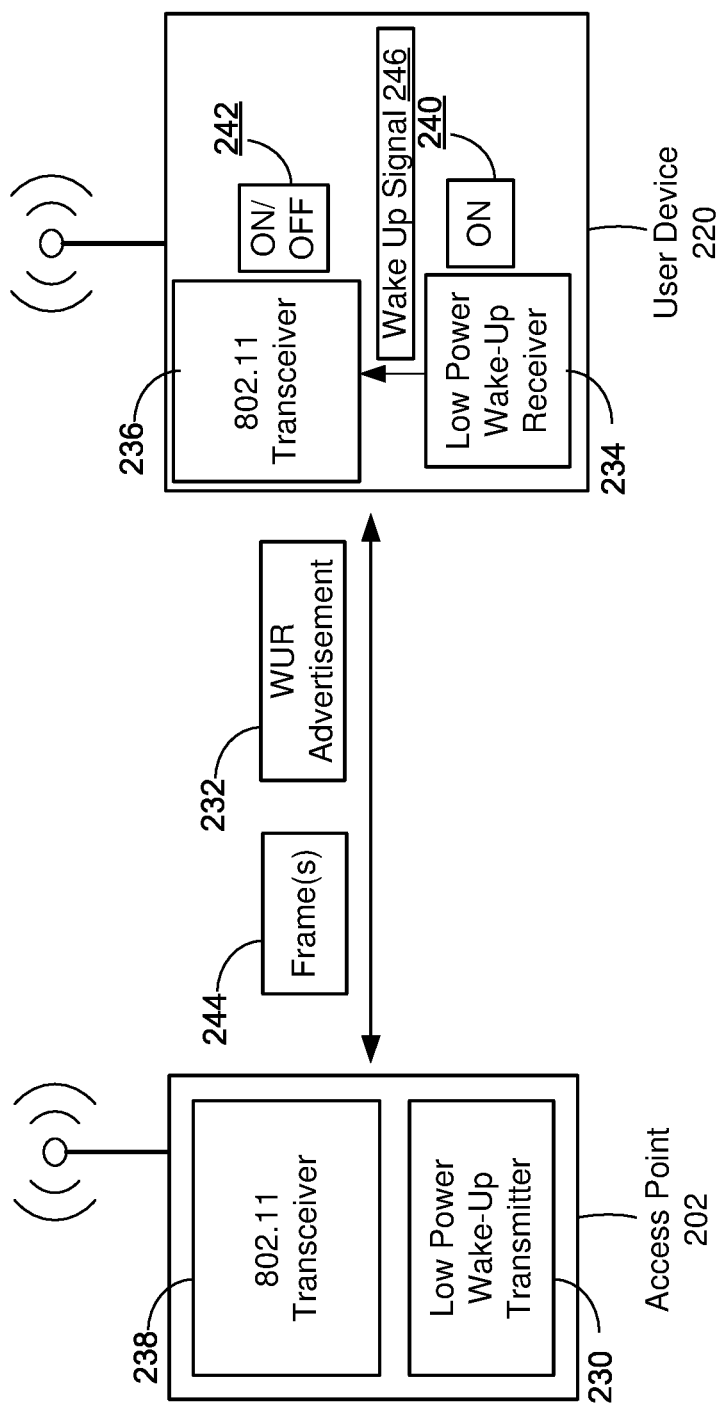
FIG. 2 depicts an illustrative schematic diagram for transmitting and receiving WUR advertisements, in accordance with one or more example embodiments of the present disclosure.

FIG. 2 depicts an illustrative schematic diagram 200 for transmitting and receiving WUR advertisements, in accordance with one or more example embodiments of the present disclosure.

Referring to FIG. 2, there is shown a transmitting device (e.g., AP 202) and a receiving device (e.g., user device 220) involved in a transmission session utilizing low power wake-up signaling. The AP 202 may utilize a low power wake-up transmitter 230 to send a frame 244 (e.g., a wake-up frame) or a WUR advertisement 232 to the low power wake-up receiver (LP-WUR) 234 included in the user device 220. In some embodiments, the AP 202 does not include a low power wake-up transmitter 230, and the frame 244 or WUR advertisement 232 is instead sent by the 802.11 transceiver 238. As discussed previously herein, a LP-WUR enables ultra-low power operation for Wi-Fi devices. The idea is for a device (e.g., the user device 220) to have a minimum power radio configuration that can receive a wake-up frame from a peer. Hence, the device can stay in low power mode (i.e., 802.11 transceiver 236 can remain in a low power state) until receiving the frame 244. Moreover, during this low power mode, the LP-WUR 234 may be used for background scanning, according to one or more embodiments. FIG. 2 shows an example of a unicast wake-up frame. It is also possible that a transmitter (e.g., an AP) may send a multicast wake-up frame to wake up more than one STA.

The LP-WUR 234 may use simple modulation schemes such as on-off keying (OOK), amplitude shift keying (ASK), or frequency shift keying (FSK) for signaling. The LP-WUR 234 may use hardware and/or software components that may allow it to operate at a lower power consumption mode than a typical radio component (e.g., 802.11 transceivers 236 and 238).

The LP-WUR 234 may be constantly active (e.g., ON state 240) on the user device 220 in order to receive a wake-up communication (e.g., the frame 244) or scan for the WUR advertisement 232. The AP 202 may begin transmitting the frame 244 or the WUR advertisement 232 using a low power communication method. The LP-WUR 234 may detect and/or decode the frame 244 or the WUR advertisement 232. In some embodiments, the LP-WUR 234 may determine whether the frame 244 is destined for the user device 220. For example, if the LP-WUR 234 (or other portions of the user device 220) determines that the receiver address (RA) field of the MAC header from the frame 244 matches the address of the user device 220, the LP-WUR 234 may then send a wake-up signal 246 to the 802.11 transceiver 236 to power on (e.g., ON/OFF state 242) its circuitry. Once the 802.11 transceiver 236 is powered on, the AP 202 and the user device 220 can exchange one or more data frames, such as, for example, beacon frame(s) 244.

The WUR advertisement 232 may include WUR information such as a wake-up period. The wake-up period may be a period of time during which the user device 220 may need to have the 802.11 transceiver 236 powered on because devices, such as the AP 202, may be sending data to the user device 220. Following the wake-up period, the user device 220 may power off some or all of its circuitry (e.g., the 802.11 transceiver 236) to reduce power consumption and preserve the life of its battery. The WUR advertisement 232 may include a WUR signal that is not a wake-up frame to facilitate the background scanning of the user device 220 and/or one or more unassociated STAs.

The low power wake-up transmitter 230 may be a device on the AP 202 that transmits a wake-up frame to other devices (e.g., the user device 220). The low power wake-up transmitter 230 may transmit at the same simple modulation schemes of the user device 220 (e.g., OOK, ASK, FSK, etc.). The low power wake-up transmitter 230 may utilize signaling in order to generate and transmit the frame 244.

It should be noted that a wake-up packet is the same as a wake-up frame. Both terms are understood to be interchangeable. Also note that the term primary connectivity radio (PCR) is used to refer to the 802.11 radio that is woken up by the WURx but this is not limited to just Wi-Fi radio as the PCR. Note that WUR transmitter is generally the AP, and WUR receiver is typically on the STA side, although other configurations are within the contemplated scope of the disclosure.

It is understood that the above descriptions are for purposes of illustration and are not meant to be limiting.

Figure 3:
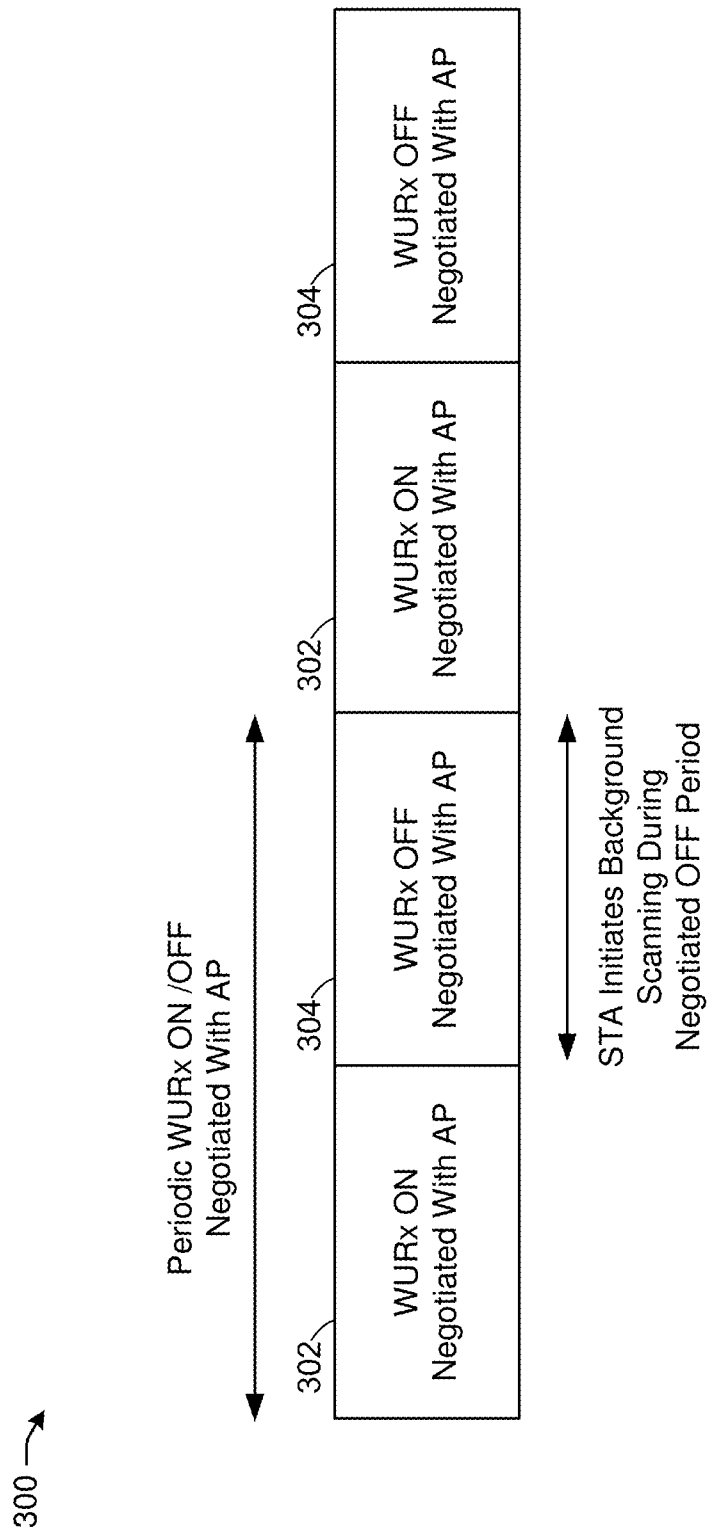
FIG. 3 depicts an illustrative schematic diagram for periodic wake-up operation negotiations, in accordance with one or more example embodiments of the present disclosure.

FIG. 3 depicts an illustrative schematic diagram 300 for periodic wake-up operation negotiations, in accordance with one or more example embodiments of the present disclosure.

As described previously herein, a WURx is fundamentally a low power receiver, and except during wake-up operation, the WURx can be used to do background scanning to collect useful information to facilitate location mapping and roaming. It is also possible that the WUR would have other uses as a very low power receive only device.

It should be noted that traditionally, background scanning is achieved by a PCR, and the scanning operation usually consumes a lot of time and power and conflicts with the regular PCR operation. Hence, using a WURx for background scanning can relieve the burden on PCR scheduling and consume less power.

Also, it should be noted that a STA may use a WURx for background scanning when the STA has not associated with any AP's to enable wake-up operation. Moreover, even if the STA has associated with an AP to enable wake-up operation, the STA can also negotiate with the AP for a specific "on time" of the WURx and may use the time not agreed with the AP for wake-up operation (e.g., the "off time") to do background scanning.

Referring to FIG. 3, there is shown an AP-STA Negotiated WURx Schedule 300. The AP-STA Negotiated WURx Schedule 300 defines alternating periods of time during which the WURx of the STA will be "ON" or "OFF" from the perspective of the AP. In other words, the AP-STA Negotiated WURx Schedule 300 may define a period 302 during which the WURx is available for wake-up operations (e.g., receiving wake-up frames) and a period 304 during which the WURx is not available for wake-up operations.

In some embodiments, the STA initiates background scanning during the period 304. In this manner, the STA can advantageously shift background scanning from the primary connectivity radio to the WURx during periods of time where the WURx would otherwise be idle.

It is understood that the above descriptions are for purposes of illustration and are not meant to be limiting.

Figure 4:
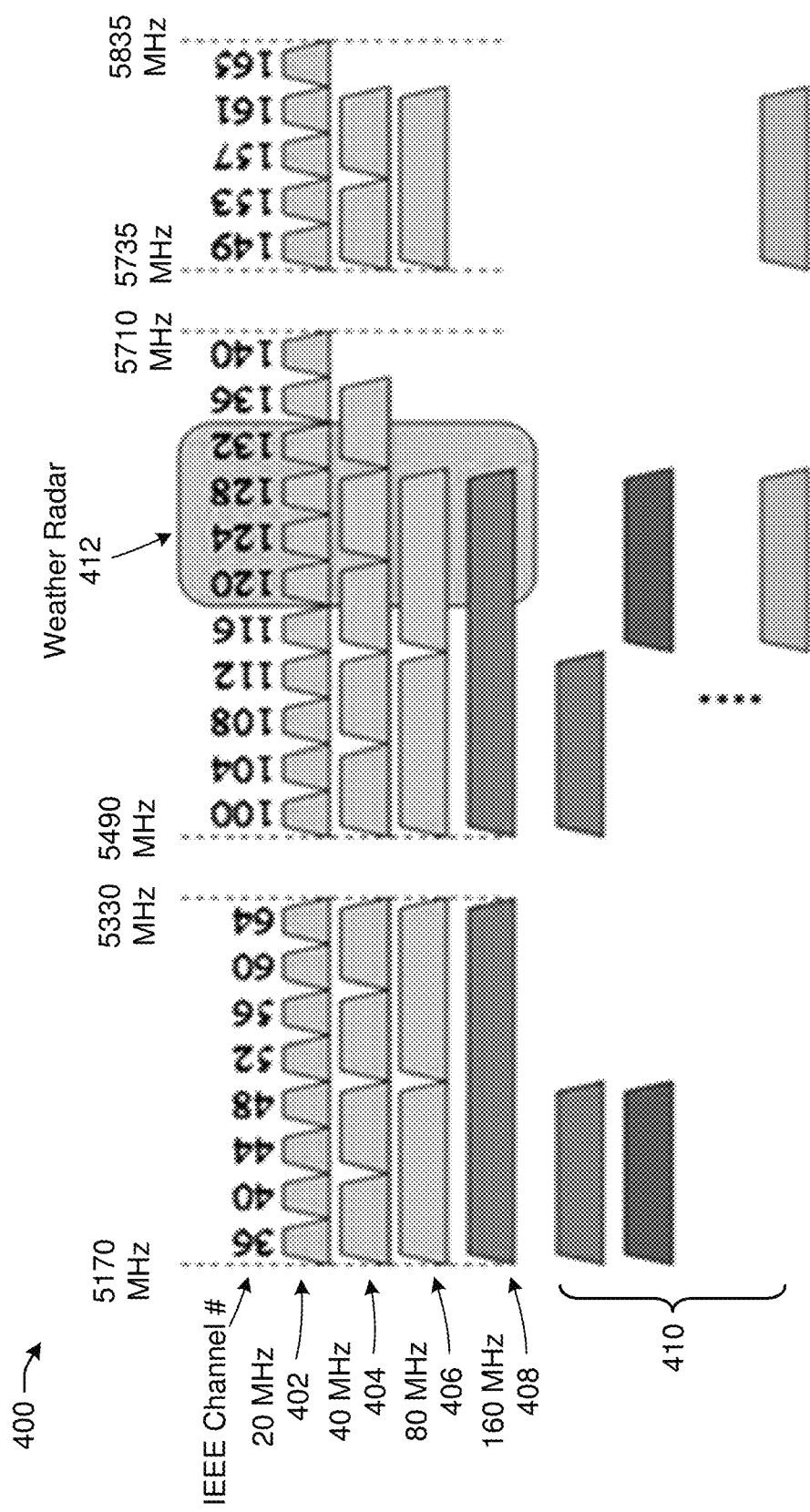
FIG. 4 depicts an illustrative schematic diagram of a channelization of the 5 GHz band, in accordance with one or more example embodiments of the present disclosure.

FIG. 4 depicts an illustrative schematic diagram 400 of a channelization of the 5 GHz band, in accordance with one or more example embodiments of the present disclosure.

IEEE 802.11ba has agreed to use multi-carrier for the transmission of wake-up frames. Due to the need of background scanning, the AP may transmit a WUR signal that is not a wake-up frame (e.g., the WUR advertisement 142 depicted in FIG. 1) to facilitate the background scanning of the unassociated STAs. In some embodiments, these WUR signals will follow the wave form of wake-up packets and will be generated by 13 subcarriers with subcarrier spacing of 312.5 kHz, i.e., around 4 MHz bandwidth.

In some embodiments, when a single band is used for transmission of a wake-up packet or a WUR advertisement, the OOK waveform of the packet or advertisement is generated by using contiguous 13 subcarriers with a subcarrier spacing of 312.5 kHz. In some embodiments, the center subcarrier is allocated or used for the WUR advertisement transmission.

Referring to FIG. 4, there is shown the channelization of 802.11 ac, i.e., operation in the 5 GHz band. As depicted in FIG. 4, the 5 GHz band includes 24 20-MHz channels 402. These 20 MHz channels can be combined to provide 11 40-MHz channels 404, 5 80-MHz channels 406, and 2 160-MHz channels 408. The channelization may also include one or more non-contiguous channels 410 (e.g., VHT80+80 MHz setups). As further depicted in FIG. 4, the channelization may also include a weather radar 412 reservation region.

As discussed previously herein, there are 24 20-MHz channels in the 5 GHz band in addition to 14 20-MHz channels in the 2.4 GHz band. Hence, there is a total of 38, 20 MHz channels that may be used by an AP to transmit WUR signals to enable background scanning operation. Further, since the bandwidth of WUR signal is 4 MHz, it is possible for an AP to choose any 4 MHz bandwidth in the 20 MHz channel to transmit the WUR signal. Without knowing in advance what an AP may do, a STA may then need to scan 38*5=190, 4 MHz subchannels to collect background information. The exact number may be more depending on the method of inserting WUR signal in the tone plan of 20 MHz band. This certainly defeats the benefits of using WURx for background scanning.

In one embodiment, discovery protocols like neighbor awareness networking (NAN) may define a common social channel for WUR discovery.

In some embodiments, NAN Discovery may operate only in channel 6 (2.437 GHz) in the 2.4 GHz frequency band and, may optionally operate in one channel in the 5 GHz frequency band. Other NAN operations may be performed in any channel.

If a NAN Device supports NAN Discovery operations in the 5 GHz frequency band, it may support a NAN Discovery Channel in the 5 GHz frequency band. The specific NAN Discovery Channel in the 5 GHz frequency band is dependent on knowing the geographical location of the device and the applicable regulatory domain rules.

If NAN Devices are permitted by local regulations to operate only in the 5.150-5.250 GHz band (called UNII-1 by FCC, other names in other jurisdictions), the 5 GHz NAN Discovery Channel may be channel 44 (5.220 GHz).

If NAN Devices are permitted by local regulations to operate only in the 5.725-5.825 GHz band (called UNII-3 by FCC, other names other jurisdictions), the 5 GHz NAN Discovery Channel may be channel 149 (5.745 GHz).

If NAN Devices are permitted by local regulations to operate in both the 5 GHz Lower and Upper bands, the 5 GHz NAN Discovery Channel may be channel 149 (5.745 GHz).

Figure 5:
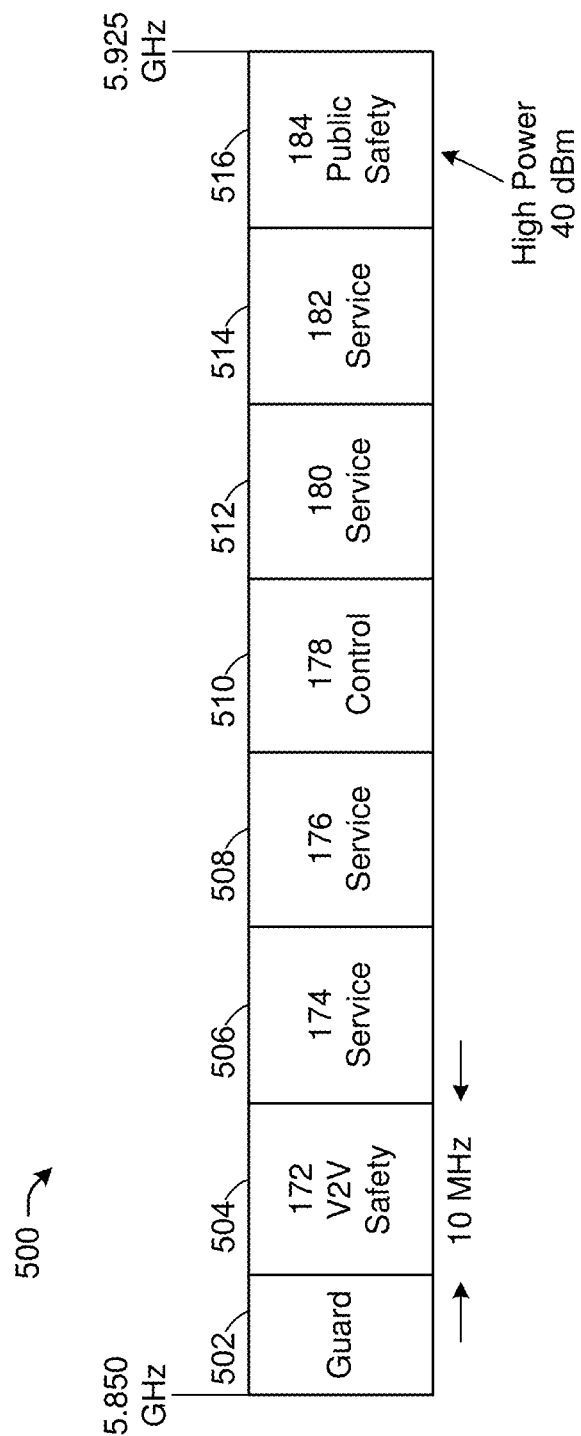
FIG. 5 depicts an illustrative schematic diagram of a channelization of the 5.9 GHz band, in accordance with one or more example embodiments of the present disclosure.

FIG. 5 depicts an illustrative schematic diagram 500 of a channelization of the 5.9 GHz band, in accordance with one or more example embodiments of the present disclosure.

Referring to FIG. 5, there is shown a dedicated short-range communication (DSRC) band channelization plan for 802.11p. The channelization plan includes a guard portion 502, a V2V Safety portion 504 (channel 172), service portions 506, 508, 512, and 514 (channels 174, 176, 180, and 182 respectively), a control portion 510 (channel 178), and a public safety portion 516 (channel 184). In some embodiments, a 10 MHz channel is allotted to each of the guard portion 504, the V2V Safety portion 504, the service portions 506, 508, 512, and 514, the control portion 510, and the public safety portion 516.

In one embodiment, one or more subchannels may be defined in one or more bands for WUR advertisement through wake-up radio. In the 5.9 GHz band for DSRC (802.11p) operation, the subchannel may be in channel 172, 178, or 184.

The DSRC band channelization plan is shown in FIG. 5. It should be noted that channel 178 is the control channel, and channels 172 and 184 are used for V2V and public safety, which may be useful for the safety alert advertisement through WUR.

As described previously herein, APs may transmit WUR advertisement information through WUR radio in one or more defined subchannels in each band according to one or more embodiments. In some embodiments, STAs use their respective WURx to scan for WUR advertisement information in the one or more defined subchannels in each band.

In the 5.9 GHz band, the subchannel follows the 10 MHz tone plan of OFDM and is in the central location of the 10 MHz band, i.e., subcarrier indexes from 2*x, where x is from −6 to 6. It should be noted that for 802.11p with 10 MHz operation in 5.9 GHz, the subcarrier spacing is 156.25 kHz. Defining the social channel (e.g., the WUR discovery subchannel) as the central location within the channel will provide better immunity from adjacent channel interference.

It is understood that the above descriptions are for purposes of illustration and are not meant to be limiting.

Figure 6:
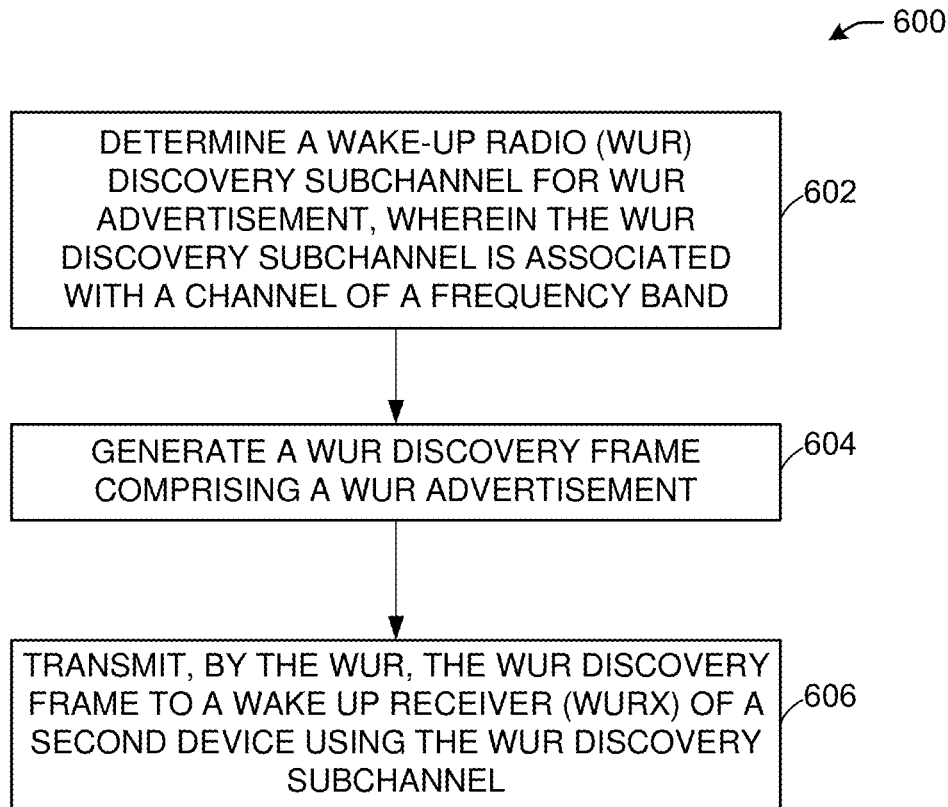
FIG. 6 illustrates a flow diagram of an illustrative process for transmitting a WUR advertisement over a WUR discovery subchannel, in accordance with one or more example embodiments of the present disclosure.

FIG. 6 illustrates a flow diagram of illustrative process 600 for transmitting a WUR advertisement over a WUR discovery subchannel, in accordance with one or more example embodiments of the present disclosure.

At block 602, a device (e.g., the user device(s) 120 and/or the AP 102 of FIG. 1) may determine a WUR discovery subchannel for WUR advertisement according to one or more embodiments. The device may include a WURx, a primary connectivity radio, and storage and processing circuitry as discussed previously herein. The WUR discovery subchannel may be associated with one or more channels of a frequency band.

In some embodiments, the frequency band for transmitting WUR advertisements includes the 2.4 GHz band, the 5 GHz band, the 5.9 GHz band, the 6 GHz band, the 60 GHz band, and the sub 1 GHz band. In some embodiments, the subchannel within each band for transmitting WUR advertisements includes 13 subcarriers and a 312.5 kHz subcarrier spacing.

In some embodiments, the band for transmitting WUR advertisements is the 2.4 GHz band. In some embodiments, the subchannel within the 2.4 GHz band for transmitting WUR advertisements is in channel 6, although other channel designations for locating the subchannel are within the contemplated scope of the disclosure.

In some embodiments, the band for transmitting WUR advertisements is the 5 GHz band. In some embodiments, the channel within the 5 GHz band which includes the subchannel for transmitting WUR advertisements is channel 44 or channel 149.

In some embodiments, the channel within the 5 GHz band which includes the subchannel for transmitting WUR advertisements depends upon which portions of the 5 GHz band local regulations allow STAs to operate in.

In some embodiments, local regulations permit operation only in the lower band (e.g., 5.150-5.250 GHz, referred to as UNII-1 by the FCC). In this scenario, the subchannel may be in channel 44 (e.g., 5.220 GHz), although other channel designations for locating the subchannel are within the contemplated scope of the disclosure.

In some embodiments, local regulations permit operation only in the upper band (e.g., 5.725-5.825 GHz, referred to as UNII-3 by the FCC). In this scenario, the subchannel may be in channel 149 (e.g., 5.745 GHz), although other channel designations for locating the subchannel are within the contemplated scope of the disclosure.

In some embodiments, local regulations permit operation in both the upper and lower portions of the 5 GHz band. In this scenario, the subchannel may be in channel 149 (e.g., 5.745 GHz), although other channel designations for locating the subchannel are within the contemplated scope of the disclosure.

In some embodiments, the band for transmitting WUR advertisements is the 5.9 GHz band. In some embodiments, the subchannel within the 5.9 GHz band for transmitting WUR advertisements is in channel 172, channel 178, or channel, 184, although other channel designations for locating the subchannel are within the contemplated scope of the disclosure.

In some embodiments, to prevent or otherwise mitigate adjacent channel interference, the subchannel for WUR advertisements is defined as the centermost or central subchannel location within the respective channel.

In some embodiments, the subchannel follows the 20 MHz tone plan of 802.11ax and is in the central location of a 20 MHz channel in the 2.4 GHz or 5 GHz band (i.e., subcarrier indexes 4*x, where x ranges from −6 to 6). In some embodiments, the subcarrier spacing for 802.11ax implementations is 78.125 kHz.

In some embodiments, the subchannel follows the 20 MHz tone plan of 802.11a/n/ac and is in the central location of a 20 MHz channel in the 2.4 GHz or 5 GHz band (i.e., subcarrier indexes from −6 to 6). In some embodiments, the subcarrier spacing for 802.11a/n/ac implementations is 312.5 kHz.

In some embodiments, the subchannel follows the 10 MHz tone plan of OFDM or 802.11p and is in the central location of a 10 MHz channel in the 5.9 GHz band (i.e., subcarrier indexes 2*x, where x ranges from −6 to 6). In some embodiments, the subcarrier spacing for 802.11p implementations is 156.25 kHz.

At block 604, the device may generate a WUR discovery frame comprising a WUR advertisement. Due to the need for background scanning, the device (e.g., an AP) may transmit a WUR signal that is not a wake-up frame (e.g., the WUR advertisement) to facilitate the background scanning of any unassociated STAs. The WUR advertisement may include, for example, WUR capabilities of the AP and/or any associated STAs, wake-up timing information (e.g., WUR "on" or "off" times), or any other advertisement information.

At block 606, the device may transmit the WUR discovery frame to a second device, where the second device comprises a WURx, using the WUR discovery subchannel. In some embodiments, the device uses its WURx for the transmission of the WUR discovery frame. In some embodiments, the second device is an unassociated STA. In some embodiments, the unassociated STA is seeking association with an AP having WUR capabilities.

In one embodiment, the WUR discovery frame is transmitted by a primary connectivity radio of the device. For example, the WUR frame may be transmitted by the 802.11 transceiver 238 of the AP 202 depicted in FIG. 2. In one embodiment, the WUR discovery frame is transmitted by a low power wake-up transmitter of a transmitting device. For example, the WUR discovery frame may be transmitted by the low power wake-up transmitter 230 of the AP 202 depicted in FIG. 2. Advantageously, transmitting the WUR discovery frame using a low power wake-up transmitter allows for a primary connectivity radio of the transmitting device to remain in a low power mode until the receiving device (e.g., the user device 222 of FIG. 2) has acknowledged the WUR frame.

In one or more embodiments, an acknowledgment may be received from the second device that indicates that a LP-WUR (e.g., the LP-WUR 234 of the user device 222 of FIG. 2) has received the WUR discovery frame. In some embodiments, the acknowledgment may indicate that a primary connectivity radio of the device (e.g., the 802.11 transceiver 236 of the user device 222 of FIG. 2) has transitioned from the low power state to the high power state. In some embodiments, the acknowledgement may include or be followed by a request to associate with the device. However, in some embodiments, no acknowledgement is received because the WURx is incapable of providing a response.

In some embodiments, the device may include a transceiver configured to transmit and receive wireless signals. In some embodiments, the device may include one or more antennas coupled to the transceiver.

It is understood that the above descriptions are for purposes of illustration and are not meant to be limiting.

Figure 7:
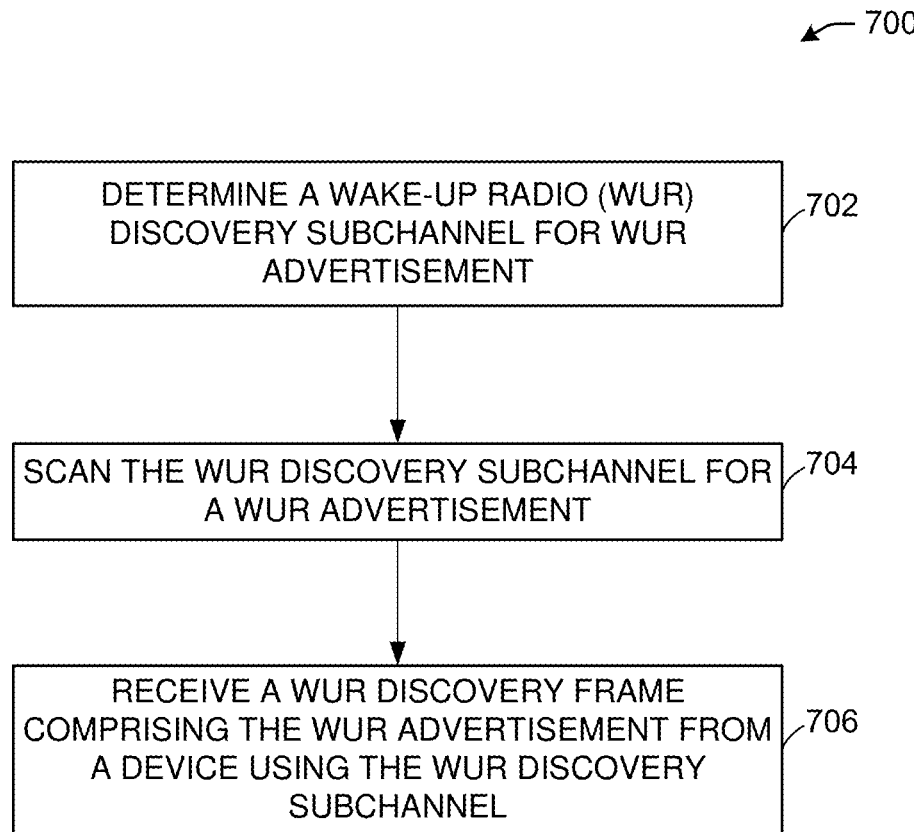
FIG. 7 illustrates a flow diagram of an illustrative process for receiving a WUR advertisement over a WUR discovery subchannel, in accordance with one or more example embodiments of the present disclosure.

FIG. 7 illustrates a flow diagram of illustrative process 700 for receiving a WUR advertisement over a WUR discovery subchannel, in accordance with one or more example embodiments of the present disclosure.

At block 702, a device (e.g., the user device(s) 120 and/or the AP 102 of FIG. 1) may determine a WUR discovery subchannel for WUR advertisement according to one or more embodiments. The device may include a WURx, a primary connectivity radio, and storage and processing circuitry as discussed previously herein. The WUR discovery subchannel may be associated with one or more channels of a frequency band.

In some embodiments, the WUR discovery subchannel is channel 6 of the 2.4 GHz band, although other channel designations for locating the subchannel are within the contemplated scope of the disclosure.

In some embodiments, the WUR discovery subchannel is channel 44 or 149 of the 5 GHz band, although other channel designations for locating the subchannel are within the contemplated scope of the disclosure.

In some embodiments, the WUR discovery subchannel is channel 172, 178, or 184 of the 5.9 GHz band, although other channel designations for locating the subchannel are within the contemplated scope of the disclosure.

In some embodiments, to prevent or otherwise mitigate adjacent channel interference, the WUR discovery subchannel is defined as the centermost or central subchannel location within a channel of the respective frequency band.

In some embodiments, the subchannel follows the 20 MHz tone plan of 802.11ax and is in the central location of a 20 MHz channel in the 2.4 GHz or 5 GHz band (i.e., subcarrier indexes 4*x, where x ranges from −6 to 6). In some embodiments, the subcarrier spacing for 802.11ax implementations is 78.125 kHz.

In some embodiments, the subchannel follows the 20 MHz tone plan of 802.11a/n/ac and is in the central location of a 20 MHz channel in the 2.4 GHz or 5 GHz band (i.e., subcarrier indexes from −6 to 6). In some embodiments, the subcarrier spacing for 802.11a/n/ac implementations is 312.5 kHz.

In some embodiments, the subchannel follows the 10 MHz tone plan of OFDM or 802.11p and is in the central location of a 10 MHz channel in the 5.9 GHz band (i.e., subcarrier indexes 2*x, where x ranges from −6 to 6). In some embodiments, the subcarrier spacing for 802.11p implementations is 156.25 kHz.

At block 704, the device may scan the WUR discovery subchannel for a WUR advertisement according to one or more embodiments. In one embodiment, the device utilizes a low power wake-up transmitter (e.g., a WURx) to scan the WUR discovery subchannel. For example, the user device 220 may use the low power wake-up receiver 234 to scan the WUR discovery subchannel as depicted in FIG. 2. Advantageously, scanning the WUR discovery subchannel using a low power wake-up transmitter allows for a primary connectivity radio of the device to remain in a low power mode.

At block 706, the device may receive a WUR discovery frame including a WUR advertisement. In some embodiments, the WUR discovery frame is transmitted across the WUR discovery subchannel. In one embodiment, the device utilizes a low power wake-up transmitter (e.g., a WURx) to receive the WUR discovery frame. For example, the user device 220 may use the low power wake-up receiver 234 to receive the WUR discovery frame as depicted in FIG. 2. In this manner, the primary connectivity radio of the device may remain in a low power mode during WUR discovery.

It is understood that the above descriptions are for purposes of illustration and are not meant to be limiting.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The transceiver 810 may be a device comprising both a transmitter and a receiver that are combined and share common circuitry (e.g., communication circuitry 802). The communication circuitry 802 may include amplifiers, filters, mixers, analog to digital and/or digital to analog converters. The transceiver 810 may transmit and receive analog or digital signals. The transceiver 810 may allow reception of signals during transmission periods. This mode is known as full-duplex and may require the transmitter and receiver to operate on different frequencies to minimize interference between the transmitted signal and the received signal. The transceiver 810 may operate in a half-duplex mode, where the transceiver 810 may transmit or receive signals in one direction at a time.

The communications circuitry 802 may include circuitry that can operate the physical layer (PHY) communications and/or media access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 2, 3, 4, 5, 6, and 7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a WUR advertisement channel device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The WUR advertisement channel device 919 may carry out or perform any of the operations and processes (e.g., processes 600 and 700) described and shown above.

The WUR advertisement channel device 919 may be configured to determine a WUR discovery subchannel for WUR advertisement according to one or more embodiments. The WUR discovery subchannel may be associated with one or more channels of a frequency band.

In some embodiments, the WUR discovery subchannel is channel 6 of the 2.4 GHz band, although other channel designations for locating the subchannel are within the contemplated scope of the disclosure.

In some embodiments, the WUR discovery subchannel is channel 44 or 149 of the 5 GHz band, although other channel designations for locating the subchannel are within the contemplated scope of the disclosure.

In some embodiments, the WUR discovery subchannel is channel 172, 178, or 184 of the 5.9 GHz band, although other channel designations for locating the subchannel are within the contemplated scope of the disclosure.

In some embodiments, the WUR discovery subchannel is a channel in the 6 GHz band, the 60 GHz band, or the sub 1 GHz band. In some embodiments, the WUR discovery subchannel is a centermost or central channel in the 6 GHz band, the 60 GHz band, or the sub 1 GHz band.

The WUR advertisement channel device 919 may be configured to scan the WUR discovery subchannel for a WUR advertisement according to one or more embodiments. In one embodiment, the WUR advertisement channel device 919 may be configured to utilizes a low power wake-up transmitter (e.g., a WURx) to scan the WUR discovery subchannel.

The WUR advertisement channel device 919 may be configured to transmit or receive a WUR discovery frame including a WUR advertisement. In some embodiments, the WUR discovery frame is transmitted across the WUR discovery subchannel. In one embodiment, the WUR advertisement channel device 919 may be configured to utilizes a low power wake-up transmitter (e.g., a WURx) to transmit or receive the WUR discovery frame.

The WUR advertisement channel device 919 may be configured to generate a WUR discovery frame comprising a WUR advertisement. Due to the need for background scanning, the WUR advertisement channel device 919 may be configured to generate a WUR signal that is not a wake-up frame (e.g., the WUR advertisement) to facilitate the background scanning of any unassociated STAs. The WUR advertisement may include, for example, WUR capabilities of the AP and/or any associated STAs, wake-up timing information (e.g., WUR "on" or "off" times), or any other advertisement information.

The WUR advertisement channel device 919 may be configured to identify a response from another device indicating an acknowledgment of the WUR discovery frame. In one embodiment, the acknowledgment indicates that a LP-WUR (e.g., the LP-WUR 234 of the user device 222 of FIG. 2) has received the WUR discovery frame. In some embodiments, the acknowledgment may indicate that a primary connectivity radio of the device (e.g., the 802.11 transceiver 236 of the user device 222 of FIG. 2) has transitioned from the low power state to the high power state. In some embodiments, the acknowledgement may include or be followed by a request to associate with the WUR advertisement channel device 919.

It is understood that the above are only a subset of what the WUR advertisement channel device 919 may be configured to perform and that other functions included throughout this disclosure may also be performed by the WUR advertisement channel device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a wake-up radio (WUR) discovery subchannel for WUR advertisement, wherein the WUR discovery subchannel may be associated with a channel of a frequency band; generate a WUR discovery frame comprising a WUR advertisement; transmit, by the WUR, the WUR discovery frame to a wake up receiver (WURx) of a second device using the WUR discovery subchannel.

Example 2 may include the device of example 1 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 3 may include the device of example 2 and/or some other example herein, wherein the frequency band comprises the 5 GHz band and the WUR discovery subchannel may be within channel 44 or channel 149 of the 5 GHz band.

Example 4 may include the device of example 1 and/or some other example herein, wherein the channel comprises 13 subcarriers and a 312.5 kHz subcarrier spacing.

Example 5 may include the device of example 4 and/or some other example herein, wherein the 13 subcarriers are associated with subcarrier indices from −6 to 6 and the WUR discovery subchannel comprises a center subcarrier having an index of 0.

Example 6 may include the device of example 1 and/or some other example herein, wherein the channel comprises 13 subcarriers and a 78.125 kHz subcarrier spacing.

Example 7 may include the device of example 1 and/or some other example herein, wherein the frequency band comprises the 2.4 GHz band and the WUR discovery subchannel may be within channel 6 of the 2.4 GHz band.

Example 8 may include the device of example 1 and/or some other example herein, wherein the frequency band comprises the 5.9 GHz band and the WUR discovery subchannel may be within channel 172, channel 178, or channel 184 of the 5.9 GHz band.

Example 9 may include the device of example 1 and/or some other example herein, further comprising a transceiver configured to transmit and receive wireless signals.

Example 10 may include the device of example 9 and/or some other example herein, further comprising one or more antennas coupled to the transceiver.

Example 11 may include a non-transitory computer-readable medium storing computer-executable instructions which when executed by one or more processors result in performing operations comprising: determining a wake-up radio (WUR) discovery subchannel for WUR advertisement, wherein the WUR discovery subchannel may be associated with a channel of a frequency band; generating a WUR discovery frame comprising a WUR advertisement; transmitting, by the WUR, the WUR discovery frame to a wake up receiver (WURx) of a second device using the WUR discovery subchannel.

Example 12 may include the non-transitory computer-readable medium of example 11 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 13 may include the non-transitory computer-readable medium of example 12 and/or some other example herein, wherein the frequency band comprises the 5 GHz band and the WUR discovery subchannel may be within channel 44 or channel 149 of the 5 GHz band.

Example 14 may include the non-transitory computer-readable medium of example 11 and/or some other example herein, wherein the channel comprises 13 subcarriers and a 312.5 kHz subcarrier spacing.

Example 15 may include the non-transitory computer-readable medium of example 14 and/or some other example herein, wherein the 13 subcarriers are associated with subcarrier indices from −6 to 6 and the WUR discovery subchannel comprises a center subcarrier having an index of 0.

Example 16 may include the non-transitory computer-readable medium of example 11 and/or some other example herein, wherein the channel comprises 13 subcarriers and a 78.125 kHz subcarrier spacing.

Example 17 may include the non-transitory computer-readable medium of example 11 and/or some other example herein, wherein the frequency band comprises the 2.4 GHz band and the WUR discovery subchannel may be within channel 6 of the 2.4 GHz band.

Example 18 may include the non-transitory computer-readable medium of example 11 and/or some other example herein, wherein the frequency band comprises the 5.9 GHz band and the WUR discovery subchannel may be within channel 172, channel 178, or channel 184 of the 5.9 GHz band.

Example 19 may include a method comprising: determine a wake-up radio (WUR) discovery subchannel for WUR advertisement, wherein the WUR discovery subchannel may be associated with a channel of a frequency band; generate a WUR discovery frame comprising a WUR advertisement; transmit, by the WUR, the WUR discovery frame to a wake up receiver (WURx) of a second device using the WUR discovery subchannel.

Example 20 may include the method of example 19 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 21 may include the method of example 20 and/or some other example herein, wherein the frequency band comprises the 5 GHz band and the WUR discovery subchannel may be within channel 44 or channel 149 of the 5 GHz band.

Example 22 may include the method of example 19 and/or some other example herein, wherein the channel comprises 13 subcarriers and a 312.5 kHz subcarrier spacing.

Example 23 may include the method of example 22 and/or some other example herein, wherein the 13 subcarriers are associated with subcarrier indices from −6 to 6 and the WUR discovery subchannel comprises a center subcarrier having an index of 0.

Example 24 may include the method of example 19 and/or some other example herein, wherein the channel comprises 13 subcarriers and a 78.125 kHz subcarrier spacing.

Example 25 may include the method of example 19 and/or some other example herein, wherein the frequency band comprises the 2.4 GHz band and the WUR discovery subchannel may be within channel 6 of the 2.4 GHz band.

Example 26 may include the method of example 19 and/or some other example herein, wherein the frequency band comprises the 5.9 GHz band and the WUR discovery subchannel may be within channel 172, channel 178, or channel 184 of the 5.9 GHz band.

Example 27 may include an apparatus comprising means for: determining a wake-up radio (WUR) discovery subchannel for WUR advertisement, wherein the WUR discovery subchannel may be associated with a channel of a frequency band; generating a WUR discovery frame comprising a WUR advertisement; transmitting, by the WUR, the WUR discovery frame to a wake up receiver (WURx) of a second device using the WUR discovery subchannel.

Example 28 may include the apparatus of example 27 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 29 may include the apparatus of example 28 and/or some other example herein, wherein the frequency band comprises the 5 GHz band and the WUR discovery subchannel may be within channel 44 or channel 149 of the 5 GHz band.

Example 30 may include the apparatus of example 27 and/or some other example herein, wherein the channel comprises 13 subcarriers and a 312.5 kHz subcarrier spacing.

Example 31 may include the apparatus of example 30 and/or some other example herein, wherein the 13 subcarriers are associated with subcarrier indices from −6 to 6 and the WUR discovery subchannel comprises a center subcarrier having an index of 0.

Example 32 may include the apparatus of example 27 and/or some other example herein, wherein the channel comprises 13 subcarriers and a 78.125 kHz subcarrier spacing.

Example 33 may include the apparatus of example 27 and/or some other example herein, wherein the frequency band comprises the 2.4 GHz band and the WUR discovery subchannel may be within channel 6 of the 2.4 GHz band.

Example 34 may include the apparatus of example 27 and/or some other example herein, wherein the frequency band comprises the 5.9 GHz band and the WUR discovery subchannel may be within channel 172, channel 178, or channel 184 of the 5.9 GHz band.

Example 35 may include a non-transitory computer-readable medium storing computer-executable instructions which when executed by one or more processors result in performing operations comprising: determine a wake-up radio (WUR) discovery subchannel for WUR advertisement, wherein the WUR discovery subchannel may be associated with a channel of a frequency band; scan the WUR discovery subchannel for a WUR advertisement; and receive a WUR discovery frame comprising the WUR advertisement from a device using the WUR discovery subchannel.

Example 36 may include the non-transitory computer-readable medium of example 35 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 37 may include the non-transitory computer-readable medium of example 36 and/or some other example herein, wherein the frequency band comprises the 5 GHz band and the WUR discovery subchannel may be within channel 44 or channel 149 of the 5 GHz band.

Example 38 may include the non-transitory computer-readable medium of example 35 and/or some other example herein, wherein the channel comprises 13 subcarriers and a 312.5 kHz subcarrier spacing.

Example 39 may include the non-transitory computer-readable medium of example 38 and/or some other example herein, wherein the 13 subcarriers are associated with subcarrier indices from −6 to 6 and the WUR discovery subchannel comprises a center subcarrier having an index of 0.

Example 40 may include the non-transitory computer-readable medium of example 35 and/or some other example herein, further comprising: negotiate, by a primary connectivity radio, a predetermined period of time with the device for a wake-up receiver (WURx) for wake-up operation; and wherein the WUR discovery subchannel may be scanned outside of the predetermined period of time.

Example 41 may include a device comprising processing circuitry coupled to storage, the processing circuitry configured to: determine a wake-up radio (WUR) discovery subchannel for WUR advertisement, wherein the WUR discovery subchannel may be associated with a channel of a frequency band; scan the WUR discovery subchannel for a WUR advertisement, and receive a WUR discovery frame comprising the WUR advertisement from a device using the WUR discovery subchannel.

Example 42 may include the device of example 41 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 43 may include the device of example 42 and/or some other example herein, wherein the frequency band comprises the 5 GHz band and the WUR discovery subchannel may be within channel 44 or channel 149 of the 5 GHz band.

Example 44 may include the device of example 41 and/or some other example herein, wherein the channel comprises 13 subcarriers and a 312.5 kHz subcarrier spacing.

Example 45 may include the device of example 44 and/or some other example herein, wherein the 13 subcarriers are associated with subcarrier indices from −6 to 6 and the WUR discovery subchannel comprises a center subcarrier having an index of 0.

Example 46 may include the device of example 41 and/or some other example herein, further comprising: negotiate, by a primary connectivity radio, a predetermined period of time with the device for a wake-up receiver (WURx) for wake-up operation; and wherein the WUR discovery subchannel may be scanned outside of the predetermined period of time.

Example 47 may include a method comprising: determine a wake-up radio (WUR) discovery subchannel for WUR advertisement, wherein the WUR discovery subchannel may be associated with a channel of a frequency band; scan the WUR discovery subchannel for a WUR advertisement; and receive a WUR discovery frame comprising the WUR advertisement from a device using the WUR discovery subchannel.

Example 48 may include the method of example 47 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 49 may include the method of example 48 and/or some other example herein, wherein the frequency band comprises the 5 GHz band and the WUR discovery subchannel may be within channel 44 or channel 149 of the 5 GHz band.

Example 50 may include the method of example 47 and/or some other example herein, wherein the channel comprises 13 subcarriers and a 312.5 kHz subcarrier spacing.

Example 51 may include the method of example 50 and/or some other example herein, wherein the 13 subcarriers are associated with subcarrier indices from −6 to 6 and the WUR discovery subchannel comprises a center subcarrier having an index of 0.

Example 52 may include the method of example 47 and/or some other example herein, further comprising: negotiate, by a primary connectivity radio, a predetermined period of time with the device for a wake-up receiver (WURx) for wake-up operation; and wherein the WUR discovery subchannel may be scanned outside of the predetermined period of time.

Example 53 may include an apparatus comprising means for: determine a wake-up radio (WUR) discovery subchannel for WUR advertisement, wherein the WUR discovery subchannel may be associated with a channel of a frequency band; scan the WUR discovery subchannel for a WUR advertisement; and receive a WUR discovery frame comprising the WUR advertisement from a device using the WUR discovery subchannel.

Example 54 may include the apparatus of example 53 and/or some other example herein, wherein the frequency band comprises at least one of a 2.4 GHz band, a 5 GHz band, a 5.9 GHz band, a 6 GHz band, a 60 GHz band, or a sub 1 GHz band.

Example 55 may include the apparatus of example 54 and/or some other example herein, wherein the frequency band comprises the 5 GHz band and the WUR discovery subchannel may be within channel 44 or channel 149 of the 5 GHz band.

Example 56 may include the apparatus of example 53 and/or some other example herein, wherein the channel comprises 13 subcarriers and a 312.5 kHz subcarrier spacing.

Example 57 may include the apparatus of example 56 and/or some other example herein, wherein the 13 subcarriers are associated with subcarrier indices from −6 to 6 and the WUR discovery subchannel comprises a center subcarrier having an index of 0.

Example 58 may include the apparatus of example 53 and/or some other example herein, further comprising: negotiate, by a primary connectivity radio, a predetermined period of time with the device for a wake-up receiver (WURx) for wake-up operation; and wherein the WUR discovery subchannel may be scanned outside of the predetermined period of time.

Example 59 may include one or more non-transitory computer-readable media comprising instructions to cause an electronic device, upon execution of the instructions by one or more processors of the electronic device, to perform one or more elements of a method described in or related to any of examples 1-58, or any other method or process described herein.

Example 60 may include an apparatus comprising logic, modules, and/or circuitry to perform one or more elements of a method described in or related to any of examples 1-58, or any other method or process described herein.

Example 61 may include a method, technique, or process as described in or related to any of examples 1-58, or portions or parts thereof.

Example 62 may include an apparatus comprising: one or more processors and one or more computer readable media comprising instructions that, when executed by the one or more processors, cause the one or more processors to perform the method, techniques, or process as described in or related to any of examples 1-58, or portions thereof.

Example 63 may include a method of communicating in a wireless network as shown and described herein.

Example 64 may include a system for providing wireless communication as shown and described herein.

Example 65 may include a device for providing wireless communication as shown and described herein.

Embodiments according to the disclosure are in particular disclosed in the attached claims directed to a method, a storage medium, a device, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a frequency band having one or more channels;
   determine a wake-up radio (WUR) discovery subchannel for WUR advertisement, wherein the WUR discovery subchannel is associated with a channel of the one or more subchannels;
   generate a WUR frame associated with discovery of the device;
   transmit the WUR frame to a wake up receiver (WURx) of a second device using the WUR discovery subchannel; and
   determine a time period negotiated by the device and a second device, the second device associated with the device during the time period, wherein the WURx of the second device is scheduled to be on during the time period, and wherein the WUR frame is transmitted at a first time, the second device unassociated with the device at the first time.

2. The device of claim 1, wherein the frequency band comprises at least one of a 2.4 GHz band, a 5 GHz band, a 5.9 GHz band, a 6 GHz band, a 60 GHz band, or a sub 1 GHz band.

3. The device of claim 2, wherein the frequency band comprises the 5 GHz band and the WUR discovery subchannel is within channel 44 or channel 149 of the 5 GHz band.

4. The device of claim 1, wherein the channel comprises 13 subcarriers and a 312.5 kHz subcarrier spacing.

5. The device of claim 4, wherein the 13 subcarriers are associated with subcarrier indices from −6 to 6 and the WUR discovery subchannel comprises a center subcarrier having an index of 0.

6. The device of claim 1, wherein the channel comprises 13 subcarriers and a 78.125 kHz subcarrier spacing.

7. The device of claim 1, wherein the frequency band comprises the 2.4 GHz band and the WUR discovery subchannel is within channel 6 of the 2.4 GHz band.

8. The device of claim 1, wherein the frequency band comprises the 5.9 GHz band and the WUR discovery subchannel is within channel 172, channel 178, or channel 184 of the 5.9 GHz band.

9. The device of claim 1, further comprising a transceiver configured to transmit and receive wireless signals.

10. The device of claim 9, further comprising one or more antennas coupled to the transceiver.

11. A non-transitory computer-readable medium storing computer-executable instructions which when executed by one or more processors result in performing operations comprising:
   identifying a wake-up radio (WUR) frame received by a station device from an access point device at a first time, the WUR frame associated with discovery of the access point device, and the station device unassociated with the access point device at the first time;
   determining, based on the WUR frame a WUR discovery subchannel for WUR advertisement, wherein the WUR discovery subchannel is associated with a channel of a frequency band;
   determining a time period negotiated by the station device and the access point device, wherein a wake up receiver (WURx) of the station device is scheduled to be on during the time period, and wherein the station device is associated with the access point device during the time period;
   scanning the WUR discovery subchannel; and
   identifying a WUR advertisement received by the station device from the access point device using the WUR discovery subchannel.

12. The non-transitory computer-readable medium of claim 11, wherein the frequency band comprises at least one of a 2.4 GHz band, a 5 GHz band, a 5.9 GHz band, a 6 GHz band, a 60 GHz band, or a sub 1 GHz band.

13. The non-transitory computer-readable medium of claim 12, wherein the frequency band comprises the 5 GHz band and the WUR discovery subchannel is within channel 44 or channel 149 of the 5 GHz band.

14. The non-transitory computer-readable medium of claim 11, wherein the channel comprises 13 subcarriers and a 312.5 kHz subcarrier spacing.

15. The non-transitory computer-readable medium of claim 14, wherein the 13 subcarriers are associated with subcarrier indices from −6 to 6 and the WUR discovery subchannel comprises a center subcarrier having an index of 0.

16. A method comprising:
   determining, by processing circuitry of a device, a frequency band having one or more channels;
   determining a wake-up radio (WUR) discovery subchannel for WUR advertisement, wherein the WUR discovery subchannel is associated with a channel of the one or more subchannels;
   generating a WUR frame associated with discovery of the device;
   transmitting, the WUR frame to a wake up receiver (WURx) of a second device using the WUR discovery subchannel; and
   determining a time period negotiated by the device and a second device, the second device associated with the device during the time period, wherein the WURx of the second device is scheduled to be on during the time period, and wherein the WUR frame is transmitted at a first time, the second device unassociated with the device at the first time.

17. The method of claim 16, wherein the frequency band comprises at least one of a 2.4 GHz band, a 5 GHz band, a 5.9 GHz band, a 6 GHz band, a 60 GHz band, or a sub 1 GHz band.

18. The method of claim 17, wherein the frequency band comprises the 5 GHz band and the WUR discovery subchannel is within channel 44 or channel 149 of the 5 GHz band.

19. The method of claim 16, wherein the channel comprises 13 subcarriers and a 312.5 kHz subcarrier spacing.

* * * * *